UNITED STATES PATENT OFFICE.

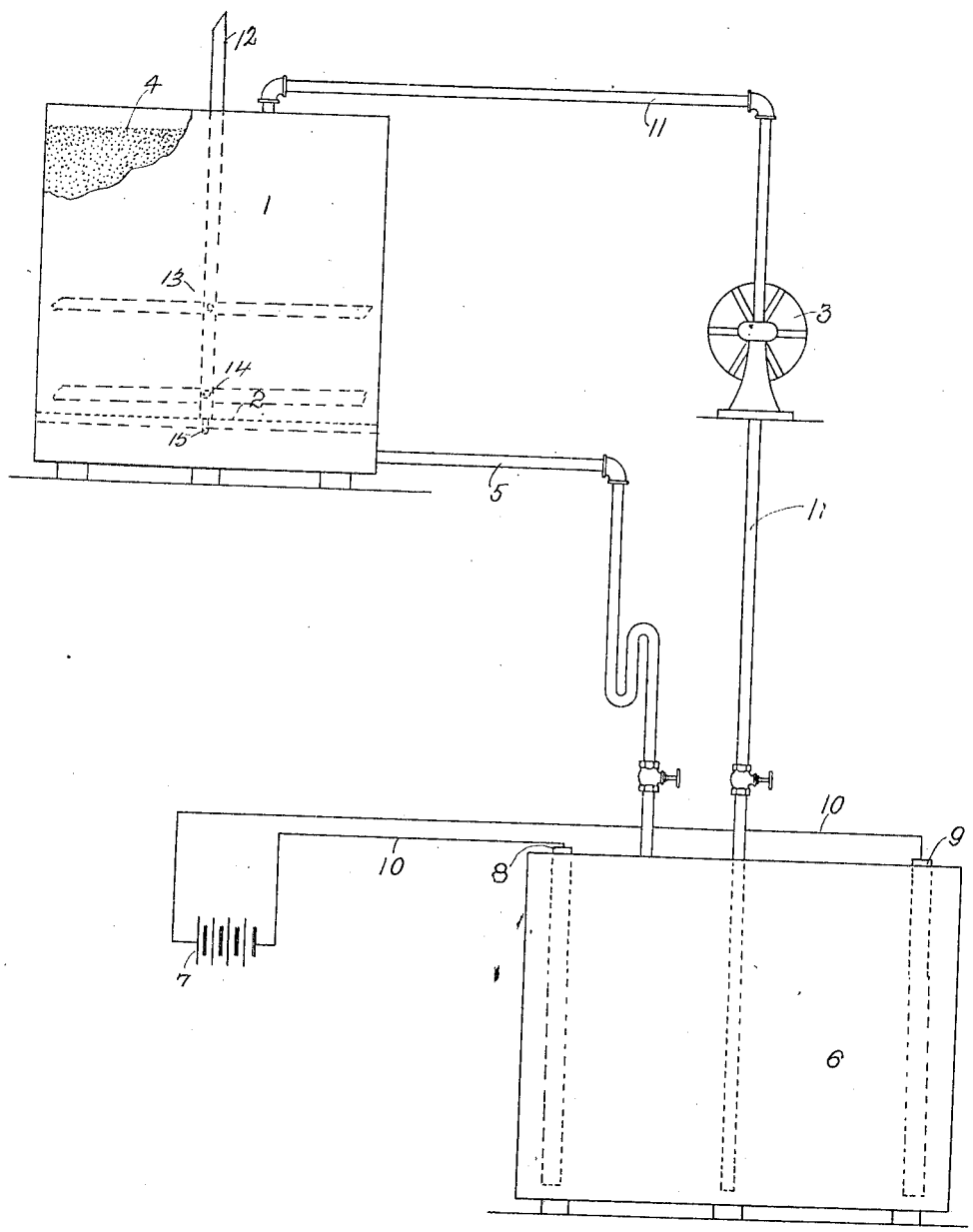

GILBERT GURNEY, OF BERKELEY, CALIFORNIA.

PROCESS FOR EXTRACTING GOLD AND SILVER FROM ORES.

No. 871,766.  Specification of Letters Patent.  Patented Nov. 19, 1907.

Application filed May 23, 1904. Serial No. 209,370.

*To all whom it may concern:*

Be it known that I, GILBERT GURNEY, a subject of Great Britain, residing at Berkeley, in the county of Alameda, State of California, have invented a new and useful Improvement in the Process of Extracting Gold and Silver from Ores, of which the following is a specification.

My invention relates primarily to the extraction of gold and silver from sulfid ores.

In the methods heretofore practiced for the reduction of such ores it has been necessary to first roast the same or subject them to some form of calcination or to some other oxidizing process which will eliminate the sulfur, requiring much time and cost in the operation.

By my process I obviate the necessity of roasting or calcination in any form, thereby reducing both time and cost in saving the values from such ores. To put it differently, in my process I take the raw ores and treat them directly with a solution containing the higher or perchlorid of a metal of two or more valencies, and thereafter precipitate the values from the resultant solution. Wherever I use the expression "raw ores" I mean ores which have not been roasted or subjected to any form of calcination or any oxidizing process.

I have discovered that when a sulfid ore carrying gold or silver is brought into intimate contact with the higher or perchlorid of a metal of two or more valencies—*e. g.* ferric chlorid—together with the chlorid of the alkali metals (sodium, potassium, ammonium, etc.,) or of the alkaline earth metals (magnesium, calcium, etc.) the chlorid will give up one chlorin ion, which in turn unites with the metal in the sulfid ore, forming a chlorid of that metal, (gold or silver as the case may be) from which the values may be easily recovered. I utilize this discovery as the basis of my process.

The accompanying drawing illustrates one form of apparatus by which my process may be practiced, in which 1, is a tank wherein the mass of ore is subjected to the action of the solvent liquid I use and hereinafter described. This tank is provided with a false bottom 2, arranged to form a chamber below the ore mass.

Numeral 4 represents the ore; 5 a drain pipe connecting the tank 1, with a precipitating vat 6: 7 an electric generator for supplying a current of electricity: 8, the anode which will preferably be of carbon, although the same may be of any substance which will not combine with the chlorin ions, and 9 the cathode disposed in the vat 6: 10—10 wire for conducting the electric current; 3 a pump, and 11 a pipe for returning the liquid by means of the pump from the vat 6 to the tank 1 for re-using after the metals have been precipitated from the solution in vat 6.

Among the sulfid ores some of them carry only silver values, others only gold, and still others both silver and gold. When silver is present it is in the form of sulfid of silver, and when gold is present it is in the form of metallic gold, mechanically held by the base sulfids. I shall first describe my process as applied to those sulfids carrying both silver and gold values.

In the tank 1, or any other suitable receptacle, I place the mass of raw ore to be treated, the same being in a sufficiently divided state to free the ore from its gangue or matrix and allow the solution to come into contact with the sulfid. I then prepare a solution consisting of the higher or perchlorid of a metal of two or more valencies— *e. g.* ferric chlorid—the chlorid of an alkali metal (sodium, potassium, ammonium, etc.) or the chlorid of an alkaline earth metal (magnesium, calcium, etc.) and a free mineral acid in quantity sufficient to submerge the mass of ore in the tank 1. In my experiments I have found that the higher or perchlorid of any metal of two or more valencies (*e. g.* ferric, cupric, mercuric, or manganic chlorid) will answer the purpose, chemically, of the first named ingredient, in a more or less degree; but in actual practice I prefer to use ferric chlorid on account of its cheapness, and hereinafter I shall describe the process as utilizing ferric chlorid, it being understood that I do not limit myself thereto, but may use any other the higher or perchlorid of any other metal of two or more valencies.

The alkali metal chlorid I prefer to use as the second ingredient is salt, but I may use any other alkali metal chlorid or an alkaline earth chlorid; and the acid I prefer as the third ingredient is hydrochloric, but I may use any other mineral acid.

I do not confine myself to any definite proportions of the named ingredients, but in practice I have found that a satisfactory result is obtained by using a saturated or nearly saturated solution of common salt containing six per cent. of ferric chlorid and one per cent. of hydrochloric acid. Accordingly I recommend these proportions, although they may be varied. This solution is poured into the tank 1. containing the ore to be treated, and the whole mass therein is thoroughly agitated by any well known method. Thus the stirrer 12 may be used for this purpose, and, in fact, almost any of the usual forms of agitating or stirring means may be employed. The stirrer shown is pivoted at 15, is adapted to be rotated within the tank by any suitable means, and is provided with two sets of radiating arms 13 and 14, extending at right angles from the shaft of the stirrer. Instead of agitating the mass, I may leach it; but agitation is preferable. The result of this operation is that the ferric chlorid gives up one chlorin ion, which unites with the gold and silver contained in the ore, forming gold and silver chlorids respectively. Thereupon these chlorids are dissolved in the solution, the presence of the alkali metal chlorid being necessary for dissolving the silver chlorid, but not for the gold chlorid, which is soluble in water alone. For the sake of brevity, I shall hereinafter use the expression alkali-metal chlorid to cover both the chlorids of alkali metals and chlorids of alkaline earth metals. The mineral acid used hastens the action. The ferric chlorid having given up one chlorin ion, is converted into ferrous chlorid. The solution carrying the metals is now drawn off from the tank through the pipe 5. into the precipitating vat 6, and there subjected to an electric current of low density supplied from electric generator 7, through wires 10—10, whereby the metals are precipitated on the cathode, from which they may be removed in any well known manner. In precipitating the metals the electric current releases the chlorin ion from its engagement with the metal, and this ion immediately recombines with the ferrous chlorid, which is thereby restored to its initial condition of ferric chlorid. As the alkali metal chlorid does not materially deteriorate in the operation, the regenerated solution is now pumped from the precipitating vat back into the tank 1 to be again used on a fresh batch of ore, and it will thus be seen that the process is cyclic.

Of course, where acid is employed, should the solution lose its acidity in use, more may be added to keep up the acid condition.

In order to secure an even deposition of the metal on the cathode I may use in the solution a small amount of gelatin either animal or vegetable, which causes the metals to more firmly adhere to the cathode.

When the ore treated is essentially a silver sulfid alone the use of the free acid is not essential, though desirable. When treating ores carrying only gold, the alkali metal chlorid may be dispensed with, inasmuch as gold chlorid is soluble in water. But when treating ores carrying silver sulfid the use of an alkali metal chlorid is necessary as a solvent for the silver chlorid.

I do not limit my process to sulfid ores; but it may be used to recover gold or silver when combined with bromin, iodin, chlorin, arsenic or tellurium, or other elements.

Having thus described my invention what I claim as new is:

1. The process of extracting the values from sulfid ores, which consists in first subjecting at normal temperature and without pressure the raw ores to the action of a solution containing the higher or perchlorid of a metal of two or more valencies, together with a chlorid of an alkali metal and a free mineral acid, and afterwards precipitating the values from the resultant solution.

2. The process of extracting the values from sulfid ores which consists in first subjecting at normal temperature, and without pressure the raw ores to the action of a solution containing ferric chlorid, sodium chlorid, and hydrochloric acid, and afterwards precipitating the values from the resultant solution by electrolytic action.

3. The process of extracting the values from sulfid ores which consists in the following steps: first, submerging the raw ores in a solution containing the higher or perchlorid of a metal of two or more valencies, together with the chlorid of an alkali metal and a free mineral acid; second, agitating the mass; third, drawing off the resultant liquid into a precipitating vat; fourth, precipitating the metals in said vat.

4. The process of extracting the values from sulfid ores which consists in the following steps: first, submerging the raw ores in a solution containing the higher or perchlorid of a metal of two or more valencies, together with a chlorid of an alkali metal and a free mineral acid; second, agitating the mass; third, drawing off the resultant liquid into a precipitating vat; fourth, precipitating the metals in said vat by electrolytic action.

5. A cyclic process for treating sulfid ores consisting of the following steps: subjecting the raw ores to the action of a solution containing the higher or perchlorid of a metal of two or more valencies, together with the chlorid of an alkali metal and a free mineral acid, whereby the metals in the ores are converted into chlorids; drawing off the resultant liquid into a precipitating vat; precipitating the metals from their chlorids in said vat, whereby the chlorin ions liberated will regenerate said higher or perchlorid of said metal of two or more valencies; then pumping the regenerated solution back into the agitating tank for use on fresh ores and then continuing the process as already described.

6. The process of extracting gold and silver from sulfid ores, which consists in treating the ores with a solution containing the higher or persalt of a metal of two or more valencies to dissolve the values from the ores, and thereafter subjecting the solution to electrolytic action simultaneously to precipitate the values from the solution and regenerate the protosalt resulting from the first step in the process back to the persalt.

In witness whereof I hereunto set my hand this 14th day of May A. D. 1904.

GILBERT GURNEY.

Witnesses:
J. H. MILLER,
SIMEON L. PHILLIPS.